July 7, 1936.   M. WEINTRAUB   2,046,713
IDENTIFICATION SEAL
Filed Dec. 11, 1934

INVENTOR.
Moses Weintraub
BY A N de Bonneville
ATTORNEY.

Patented July 7, 1936

2,046,713

UNITED STATES PATENT OFFICE 2,046,713

IDENTIFICATION SEAL

Moses Weintraub, Brooklyn, N. Y.

Application December 11, 1934, Serial No. 756,945

2 Claims. (Cl. 40—3)

This invention relates to an identification seal for chickens, and various fowls.

The object of the invention is the production of a seal adapted to be clamped around the legs of a fowl and the like, for the purpose of identification, and which cannot be removed unless broken and made useless.

The second object of the invention is the production of a locking seal which may be locked to the leg of a fowl without the use of any tools and the like.

The third object of the invention is the production of a seal, which can be easily locked to the leg of a fowl by the operator with one hand only.

Figure 1:
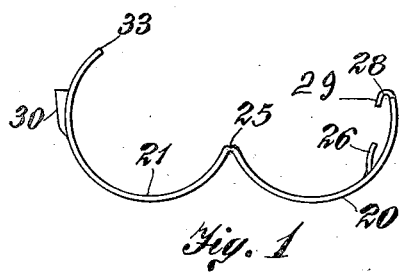
Figure 2:
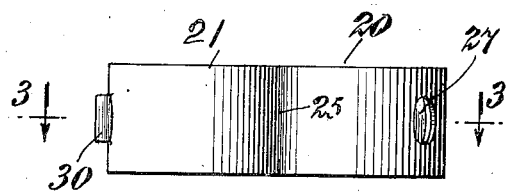
Figure 3:
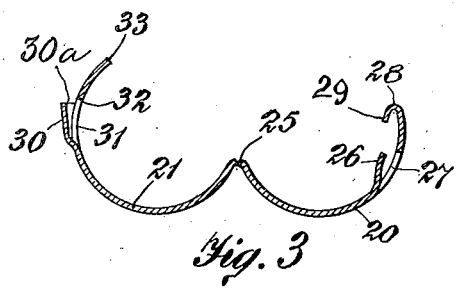
Figure 4:
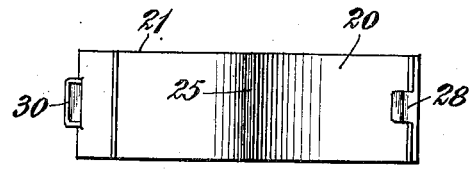
Figure 6:
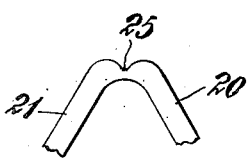
Figure 5:
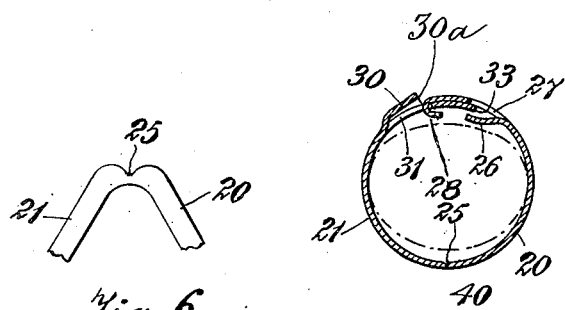

In the accompanying drawing Fig. 1 represents an enlarged end view of the identification seal in its open position; Fig. 2 shows a bottom view of Fig. 1; Fig. 3 indicates a section of Fig. 2 on the line 3—3; Fig. 4 represents a top view of Fig. 1; Fig. 5 indicates a section similar to Fig. 3 with the members of the seal in locked position around the leg of a chicken or other fowl, and Fig. 6 shows an enlarged fragmentary portion of Fig. 1.

The identification seal comprises the semi-cylindrical shaped member 20 with its appurtenances and the semi-cylindrical shaped member 21 and its appurtenances, integral therewith. At the junction of the ends of the members 20 and 21 is indicated the crosswise recess 25.

The member 20 has pressed therefrom the inwardly extending protecting tongue 26, of less width than said member 20, leaving the opening 27, and at the outer end of said member 20 is indicated the inwardly curved locking hook 28, also of less width than the said member 20. The outer end of the hook 28 is indicated at 29.

The second member 21 of the seal has pressed therefrom the outwardly extending guard 30 having the outer edge 30a and of less width than said member 21, leaving the opening 31 with the locking edge 32. The outer end of the member 21 is indicated at 33.

The seal has its members 20 and 21 in their open position as shown in Figs. 1 to 4 when it is to be locked to the leg of a fowl and the recess 25 is positioned to bear against one face of said leg. The operator then with one hand positions the members 20 and 21 around the leg of the fowl, the contour of the cross section of which is shown at 40. In this position the members 20 and 21 are disposed to produce a practically circular band around the leg of the fowl. When the said members 20 and 21 are moved to their locked position, see Fig. 5, the locking hook 28 extends through the opening 31 and bears against the locking edge 32. In this position the guard 30 covers the said hook 28 and maintains the latter in place, providing a locking means for the ends of the members 20 and 21.

The end 33 of the member 21 is located between the tongue 26 and the inner face of the member 20, which provides a second locking means for the ends of the members 20 and 21.

To detach the seal from the leg of the fowl the locking hook 28 is disengaged from the locking edge 32 and pulled out of the opening 31. The operator then bends the members 20 and 21 to their open position when the leg can be easily removed from the seal.

Should it be attempted to again use the seal, and if it is attempted to again position it in its locking position, the seal will break at the recess 25, making it impossible to again be used as an identification seal.

The distance between the outer edge 30a of the guard 30 and the locking edge 32 is preferably less than the distance between the outer end 29 of the hook 28 and the opposite portion of the member 20. By this disposition the hook can be safely locked between the guard 30 and said locking edge 32.

Various modifications may be made in the invention and the present exemplification is to be taken as illustrative and not limitative thereof.

Having described my invention, I claim

1. In an identification seal the combination of a pair of semi-cylindrical members connected at their inner ends and having a recess crosswise thereof at said inner ends, an inwardly extending tongue integral with one of said members and a locking hook at the end of said members, an outwardly extending guard integral with the second member forming an opening with a locking edge in the latter member, said hook locked with said locking edge when the seal is bent in locked position and the outer end of the second member positioned between the inner face of the other member and its tongue.

2. In an identification seal the combination of a pair of semi-cylindrical members connected at their inner ends and having a recess crosswise, thereof at said inner ends, an inwardly extending tongue integral with one of said members and a locking hook integral with and at the end of said member, and an outwardly extending guard having an outer edge, integral with the second member and forming an opening with a second member locking edge, the distance between the outer end of said hook and the opposite and adjacent portion of the member with which it is integral being greater than the distance between the outer edge of the guard and said locking edge, said hook locked between said locking edge and the outer edge of said guard when in operative position.

MOSES WEINTRAUB.